US012705625B2

(12) United States Patent
Cao et al.

(10) Patent No.: US 12,705,625 B2
(45) **Date of Patent: *Aug. 11, 2026**

(54) SYSTEM, METHOD, AND COMPUTER PROGRAM PRODUCT FOR BREACH DETECTION USING CONVOLUTIONAL NEURAL NETWORKS

(71) Applicant: Visa International Service Association, San Francisco, CA (US)

(72) Inventors: Shi Cao, Austin, TX (US); Shubham Agrawal, Round Rock, TX (US); Chiranjeet Chetia, Round Rock, TX (US); Claudia Carolina Barcenas Cardenas, Austin, TX (US); David Stoddard Lambertson, Seattle, WA (US); Beatrice-Atena Faurescu, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 243 days.

This patent is subject to a terminal disclaimer.

(21) Appl. No.: 18/741,846

(22) Filed: Jun. 13, 2024

(65) Prior Publication Data

US 2025/0078084 A1 Mar. 6, 2025

Related U.S. Application Data

(63) Continuation of application No. 17/477,607, filed on Sep. 17, 2021, now Pat. No. 12,039,538, which is a (Continued)

(51) Int. Cl.

| | |
|---|---|
| ***G06Q 20/40*** | (2012.01) |
| ***G06T 7/00*** | (2017.01) |
| ***H04L 9/40*** | (2022.01) |

(52) U.S. Cl.
CPC ........... *G06Q 20/4016* (2013.01); *G06T 7/97* (2017.01); *H04L 63/1416* (2013.01); *G06T 2207/20084* (2013.01)

(58) Field of Classification Search
CPC ................................................. G06Q 20/4016
See application file for complete search history.

(56) References Cited

U.S. PATENT DOCUMENTS

| | | | |
|---|---|---|---|
| 5,438,628 A | | 8/1995 | Spitz et al. |
| 5,799,301 A | | 8/1998 | Castelli et al. |

(Continued)

FOREIGN PATENT DOCUMENTS

| | | | | |
|---|---|---|---|---|
| CN | 110163611 A | * | 8/2019 | ....... G06Q 20/40145 |
| GB | 2584982 A | * | 12/2020 | ............. G06N 5/048 |
| WO | 2020023003 A1 | | 1/2020 | |

OTHER PUBLICATIONS

"Modi et al., Review On Fraud Detection Methods in Credit Card Transactions, Mar. 22, 2018, IEEE, entire document" (Year: 2018).*

(Continued)

*Primary Examiner* — Abhishek Vyas
*Assistant Examiner* — Adam Hilmantel
(74) *Attorney, Agent, or Firm* — The Webb Law Firm

(57) ABSTRACT

Systems, methods, and computer program products are provided for breach detection using convolutional neural networks (CNNs). An example system includes a processor configured to generate a plurality of permuted images, each image comprising a field of points associated with suspected fraudulent transactions, an x-axis position of each point associated with a time, and a y-axis position of each point corresponding to a randomized index of a payment device. The processor is also configured to assign a breach likelihood score to each image using a CNN model. The processor is further configured to compare the breach likelihood score of each image to a threshold score. The processor is further (Continued)

configured to detect the breach event based on one or more breach likelihood scores satisfying the threshold score. The processor is further configured to, in response to detecting the breach event, decline transactions with the entity associated with the breach event.

20 Claims, 10 Drawing Sheets

Related U.S. Application Data continuation-in-part of application No. 17/218,811, filed on Mar. 31, 2021, now abandoned.

(60) Provisional application No. 63/191,030, filed on May 20, 2021, provisional application No. 63/003,479, filed on Apr. 1, 2020.

(56) References Cited

U.S. PATENT DOCUMENTS

| | | | | |
|---|---|---|---|---|
| 9,392,008 | B1 | 7/2016 | Michel et al. | |
| 9,892,293 | B1 * | 2/2018 | Wade | G06F 21/86 |
| 10,956,402 | B2 | 3/2021 | Patel | |
| 2005/0198563 | A1 | 9/2005 | Kristjansson | |
| 2005/0240569 | A1 | 10/2005 | Cheng et al. | |
| 2010/0169137 | A1 | 7/2010 | Jastrebski et al. | |
| 2014/0095476 | A1 | 4/2014 | Valentin | |
| 2015/0032738 | A1 | 1/2015 | Nachnani et al. | |
| 2015/0193768 | A1 * | 7/2015 | Douglas | G06Q 20/405 705/44 |
| 2015/0339673 | A1 | 11/2015 | Adjaoute | |
| 2017/0004413 | A1 | 1/2017 | Flores et al. | |
| 2018/0025256 | A1 | 1/2018 | Bai et al. | |
| 2019/0066110 | A1 | 2/2019 | Shen et al. | |
| 2019/0236609 | A1 | 8/2019 | Li | |
| 2019/0378010 | A1 | 12/2019 | Morris et al. | |
| 2020/0034842 | A1 * | 1/2020 | Ponniah | G06Q 20/405 |
| 2020/0211019 | A1 * | 7/2020 | Allbright | G06N 20/10 |
| 2020/0366699 | A1 * | 11/2020 | Sampaio | G06F 16/24568 |
| 2021/0158129 | A1 * | 5/2021 | Srivastava | G06N 3/0499 |
| 2021/0279731 | A1 | 9/2021 | Agrawal et al. | |
| 2021/0303970 | A1 * | 9/2021 | Ma | G06N 3/09 |

OTHER PUBLICATIONS

Abbas et al., "Long Range Time Series Forecasting By Upsampling and Using Cross-Correlation Based Selection of Nearest Neighbor", International Journal of Pattern Recognition and Artificial Intelligence, 2006, pp. 1261-1278; vol. 20:8.

Alneyadi et al., "A survey on data leakage prevention systems", Journal of Network and Computer Applications, 2016, pp. 137-152, vol. 62.

Anandakrishnan et al., "Anomaly Detection in Finance: Editors' Introduction", Proceedings of Machine Learning Research, Workshop on Anomaly Detection in Finance, 2017, 7 pages, vol. 71.

Bahnsen et al., "Feature engineering strategies for credit card fraud detection", Expert Systems With Applications, 2016, pp. 134-142, vol. 51.

Belongie et al., "Shape Matching and Object Recognition Using Shape Contexts", IEEE Transactions on Pattern Analysis and Machine Intelligence, 2002, pp. 509-522, vol. 24:24.

Cao et al., "Integrated Oversampling for Imbalanced Time Series Classification", IEEE Transactions on Knowledge and Data Engineering, 2013, 14 pages, vol. 25:12.

Cheng et al., "Enterprise data breach: causes, challenges, prevention, and future directions", WIREs Data Mining Knowl Discov, 2017, 14 pages.

Ciresan et al., "Multi-column Deep Neural Networks for Image Classification", IEEE Conference on Computer Vision and Pattern Recognition, 2012, pp. 3642-3649.

Davis et al., "Data Preprocessing for Anomaly Based Network Intrusion Detection: A Review", Computer and Secuirty, 2011, pp. 353-375, vol. 30:6-7.

Lecun et al., "The MNIST database of handwritten digits", Retrieved Apr. 15, 2021 from http://yann.lecun.com/exdb/mnist/.

Lecun et al., "Gradient-Based Learning Applied to Document Recognition", Proc. of the IEEE, Nov. 1998, pp. 2278-2324.

Modi et al., "Review On Fraud Detection Methods in Credit Card Transactions", 2017 International Conference on Intelligent Computing and Control, Mar. 22, 2018, 5 pages.

Pang et al., "Text Matching as Image Recognition", Association for the Advancement of Artificial Intelligence, 2016, 8 pages.

Ponemon Institute, "Cost of Data Breach Report 2020", 2020, Retrieved Apr. 15, 2021 from https://www.ibm.com/security/digital-assets/cost-data-breach-report.

Redondi et al., "Compress-then-analyze vs. analyze-then compress: Two paradigms for image analysis in visual sensor networks", IEEE, 2013, 5 pages.

Van Adelsberg et al., "Binned Kernels for Anomaly Detection in Multi-timescale Data using Gaussian Processes", Proceedings of Machine Learning Research, Workshop on Anomaly Detection in Finance, 2017, pp. 102-113, vol. 17.

Weiss et al., "The Target and Other Financial Data Breaches: Frequently Asked Questions", Congressional Research Service, 2015, 38 pages.

* cited by examiner

100
CNN Model Server 106
Consumer Computing Device 111
Merchant Computing Device 109
Fraud Evaluation Server 104
Communication Network 110
Payment Device 101
Transaction Processing System 102
Merchant System 108

500
502
$M_A$
$C_1$
$C_2$
...
$C_N$
$T_1$
$T_2$
$T_3$
$T_4$
...
$T_N$
504
Payment Devices
Time Periods
0
10
20
30
40
50
60
70
80

SYSTEM, METHOD, AND COMPUTER PROGRAM PRODUCT FOR BREACH DETECTION USING CONVOLUTIONAL NEURAL NETWORKS

CROSS-REFERENCE TO RELATED APPLICATIONS

This application is a continuation of U.S. patent application Ser. No. 17/477,607, filed Sep. 17, 2021, titled "System, Method, and Computer Program Product for Breach Detection Using Convolutional Neural Networks", which is a continuation-in-part of U.S. patent application Ser. No. 17/218,811, filed Mar. 31, 2021, titled "System, Method, and Computer Program Product for Merchant Breach Detection Using Convolutional Neural Networks", which claims the benefit of U.S. Provisional Patent Application No. 63/003,479, filed Apr. 1, 2020, titled "System, Method, and Computer Program Product for Merchant Breach Detection Using Convolutional Neural Networks." U.S. patent application Ser. No. 17/477,607 further claims the benefit of U.S. Provisional Patent Application No. 63/191,030, filed May 20, 2021, titled "System, Method, and Computer Program Product for Merchant Breach Detection Using Convolutional Neural Networks." The entire disclosures of the foregoing are incorporated by reference herein.

BACKGROUND

1. Technical Field

This disclosure relates generally to fraud detection systems, and, in non-limiting embodiments or aspects, to systems, methods, and computer program products for breach detection using convolutional neural network analysis of processed transaction data.

2. Technical Considerations

Breach (e.g., data security vulnerability) detection and fraud mitigation is a challenging problem due to the extreme imbalance of data. The number of breached systems in a network may be very small compared to the overall number of systems and network transaction volume. For the example of merchant breach, the ratio of breached merchants to non-breached merchants may be as low as 1:100,000. Only about a few hundred confirmed breach events per year yields largely insufficient data by which to train entity-comparison breach detection models. Machine learning or other statistical methods for detecting breach typically require a large volume of samples as input, e.g., for a training data set. It may be difficult to extract common features from only a few hundred confirmed cases to develop a general breach detection rule or model for entities (e.g., merchants). Less accurate detection models have increased rates of false positives and/or false negatives in identifying breach events, which creates computational inefficiencies in fraud mitigation processes (e.g., wasted computer processing, bandwidth, memory, etc.).

Furthermore, current breach detection systems are often slow and reactionary to actual instances of confirmed fraud as reported by consumers. A high number of transactions may continue to occur at/with a breached entity before a traditional breach detection system identifies the breach. Breach events may lead to increased rates of network transaction messages (e.g., fraudulent transactions) that may persist until network security countermeasures are executed.

There is a need in the art for a technically improved breach detection system to identify breach earlier after a breach event to reduce the number of post-breach transactions and to improve the computational efficiency of breach detection and mitigation. There is a further need in the art for a reliable, automated method of detecting breach in merchants so that security countermeasures may be accurately and promptly enabled.

SUMMARY

Accordingly, provided are improved systems, methods, and computer program products for breach detection using convolutional neural networks (CNNs).

According to non-limiting embodiments or aspects, provided is a method for breach detection using CNNs. The method includes receiving, with at least one processor, transaction data associated with a plurality of transactions completed in a first time period. The method further includes identifying, with the at least one processor, a set of suspected fraudulent transactions of the plurality of transactions based on inputting at least one parameter of the transaction data into a fraud evaluation model. The method further includes generating, with the at least one processor, an image including a field of points, wherein each point of the field of points is associated with at least one transaction of the set of suspected fraudulent transactions, and wherein an x-axis position in the image of each point in the field of points is associated with a time subperiod of the first time period in which the at least one transaction occurred. The method further includes detecting, with the at least one processor, a breach event by processing the image with a CNN model.

In some non-limiting embodiments or aspects, the at least one parameter may include at least one of the following: chargeback data, reported fraud data, decline data, or any combination thereof.

In some non-limiting embodiments or aspects, a y-axis position in the image of each point in the field of points may correspond to an index of a payment device of a plurality of payment devices associated with the plurality of transactions.

In some non-limiting embodiments or aspects, the method may further include generating, with the at least one processor, a plurality of permuted images, wherein indexes of the plurality of payment devices are randomized for each of the plurality of permuted images, such that the corresponding y-axis position of each point in the field of points is also randomized in each of the plurality of permuted images. The method may further include detecting, with the at least one processor, the breach event by processing each of the plurality of permuted images with the CNN model.

In some non-limiting embodiments or aspects, detecting the breach event further may include assigning a breach likelihood score to the image using the CNN model, comparing the breach likelihood score to a threshold score generated from evaluations of transaction data from previous time periods and other breach events, and detecting the breach event based on the breach likelihood score satisfying the threshold score.

In some non-limiting embodiments or aspects, the method may include generating, with the at least one processor, display data configured to cause a computing device to display a user interface depicting the breach likelihood score, the image visually adjacent a time scale, and a visual indicator of where in the image the breach event occurred. The method may further include communicating, with the at least one processor, the display data to a merchant system.

The method may further include receiving, with the at least one processor, an instruction to execute a network security countermeasure from the merchant system. The method may further include executing, with the at least one processor, the network security countermeasure.

In some non-limiting embodiments or aspects, the method may include, in response to detecting the breach event, initiating, with the at least one processor, a network security countermeasure including at least one of the following: declining transactions with an entity associated with the breach event; freezing at least one transaction account associated with at least one payment device associated with at least one transaction of the plurality of transactions; communicating at least one alert to a user of the at least one payment device; or any combination thereof.

In some non-limiting embodiments or aspects, an intensity value of each point of the field of points may be based on a number of suspected fraudulent transactions associated with a payment device having occurred in a time subperiod.

In some non-limiting embodiments or aspects, the kernel size of the CNN model may be 9×9.

According to non-limiting embodiments or aspects, provided is a system for breach detection using CNNs. The system includes a server including at least one processor. The server is programmed or configured to receive transaction data associated with a plurality of transactions completed in a first time period. The server is also programmed or configured to identify a set of suspected fraudulent transactions of the plurality of transactions based on inputting at least one parameter of the transaction data into a fraud evaluation model. The server is further programmed or configured to generate an image including a field of points, wherein each point of the field of points is associated with at least one transaction of the set of suspected fraudulent transactions, and wherein an x-axis position in the image of each point in the field of points is associated with a time subperiod of the first time period in which the at least one transaction occurred. The server is further programmed or configured to detect a breach event by processing the image with a CNN model.

In some non-limiting embodiments or aspects, the at least one parameter may include at least one of the following: chargeback data, reported fraud data, decline data, or any combination thereof.

In some non-limiting embodiments or aspects, a y-axis position in the image of each point in the field of points may correspond to an index of a payment device of a plurality of payment devices associated with the plurality of transactions. The server may be further programmed or configured to generate a plurality of permuted images, wherein indexes of the plurality of payment devices are randomized for of the plurality of permuted images, such that the corresponding y-axis position of each point in the field of points is also randomized in each of the plurality of permuted images. The server may be further programmed or configured to detect the breach event by processing each of the plurality of permuted images with the CNN model.

In some non-limiting embodiments or aspects, detecting the breach event may further include assigning a breach likelihood score to the image using the CNN model, comparing the breach likelihood score to a threshold score generated from evaluations of transaction data from previous time periods and other breach events, and detecting the breach event based on the breach likelihood score satisfying the threshold score.

In some non-limiting embodiments or aspects, the server may be further programmed or configured to: generate display data configured to cause a computing device to display a user interface depicting the breach likelihood score, the image visually adjacent a time scale, and a visual indicator of where in the image the breach event occurred. The server may be further programmed or configured to communicate the display data to a merchant system. The server may be further programmed or configured to receive an instruction to execute a network security countermeasure from the merchant system. The server may be further programmed or configured to execute the network security countermeasure.

In some non-limiting embodiments or aspects, the server may be further programmed or configured to, in response to detecting the breach event, initiate a network security countermeasure including at least one of the following: declining transactions with an entity associated with the breach event; freezing at least one transaction account associated with at least one payment device associated with at least one transaction of the plurality of transactions; communicating at least one alert to a user of the at least one payment device; or any combination thereof.

In some non-limiting embodiments or aspects, an intensity value of each point of the field of points may be based on a number of suspected fraudulent transactions associated with a payment device having occurred in a time subperiod.

According to non-limiting embodiments or aspects, provided is a computer program product for breach detection using CNNs. The computer program product includes at least one non-transitory computer-readable medium including program instructions that, when executed by at least one processor, cause the at least one processor to receive transaction data associated with a plurality of transactions completed in a first time period. The program instructions also cause the at least one processor to identify a set of suspected fraudulent transactions of the plurality of transactions based on inputting at least one parameter of the transaction data into a fraud evaluation model. The program instructions further cause the at least one processor to generate an image including a field of points, wherein each point of the field of points is associated with at least one transaction of the set of suspected fraudulent transactions, and wherein an x-axis position in the image of each point in the field of points is associated with a time subperiod of the first time period in which the at least one transaction occurred. The program instructions further cause the at least one processor to detect a breach event by processing the image with a CNN model.

In some non-limiting embodiments or aspects, a y-axis position in the image of each point in the field of points may correspond to an index of a payment device of a plurality of payment devices associated with the plurality of transactions. The program instructions may further cause the at least one processor to generate a plurality of permuted images, wherein indexes of the plurality of payment devices are randomized for each of the plurality of permuted images, such that the y-axis position of each point in the field of points is also randomized in each of the plurality of permuted images. The program instructions may further cause the at least one processor to detect the breach event by processing each of the plurality of permuted images with the CNN model.

In some non-limiting embodiments or aspects, detecting the breach event may further include assigning a breach likelihood score to the image using the CNN model, comparing the breach likelihood score to a threshold score generated from evaluations of transaction data from previous time periods and other breach events, and detecting the breach event based on the breach likelihood score satisfying the threshold score. The program instructions may further cause the at least one processor to generate display data configured to cause a computing device to display a user interface depicting the breach likelihood score, the image visually adjacent a time scale, and a visual indicator of where in the image the breach event occurred. The program instructions may further cause the at least one processor to communicate the display data to a merchant system. The program instructions may further cause the at least one processor to receive an instruction to execute a network security countermeasure from the merchant system. The program instructions may further cause the at least one processor to execute the network security countermeasure.

In some non-limiting embodiments or aspects, the program instructions may further cause the at least one processor to, in response to detecting the breach event, initiate a network security countermeasure including at least one of the following: declining transactions with an entity associated with the breach event; freezing at least one transaction account associated with at least one payment device associated with at least one transaction of the plurality of transactions; communicating at least one alert to a user of the at least one payment device; or any combination thereof.

Further non-limiting embodiments or aspects are set forth in the following numbered clauses:

Clause 1: A computer-implemented method comprising: receiving, with at least one processor, transaction data associated with a plurality of transactions completed in a first time period; identifying, with the at least one processor, a set of suspected fraudulent transactions of the plurality of transactions based on inputting at least one parameter of the transaction data into a fraud evaluation model; generating, with the at least one processor, an image comprising a field of points, wherein each point of the field of points is associated with at least one transaction of the set of suspected fraudulent transactions, and wherein an x-axis position in the image of each point in the field of points is associated with a time subperiod of the first time period in which the at least one transaction occurred; and detecting, with the at least one processor, a breach event by processing the image with a convolutional neural network (CNN) model.

Clause 2: The computer-implemented method of clause 1, wherein the at least one parameter comprises at least one of the following: chargeback data, reported fraud data, decline data, or any combination thereof.

Clause 3: The computer-implemented method of clause 1 or clause 2, wherein a y-axis position in the image of each point in the field of points corresponds to an index of a payment device of a plurality of payment devices associated with the plurality of transactions.

Clause 4: The computer-implemented method of any of clauses 1-3, further comprising: generating, with the at least one processor, a plurality of permuted images, wherein indexes of the plurality of payment devices are randomized for each of the plurality of permuted images, such that the corresponding y-axis position of each point in the field of points is also randomized in each of the plurality of permuted images; and detecting, with the at least one processor, the breach event by processing each of the plurality of permuted images with the CNN model.

Clause 5: The computer-implemented method of any of clauses 1-4, wherein detecting the breach event comprises: assigning a breach likelihood score to the image using the CNN model; comparing the breach likelihood score to a threshold score generated from evaluations of transaction data from previous time periods and other breach events; and detecting the breach event based on the breach likelihood score satisfying the threshold score.

Clause 6: The computer-implemented method of any of clauses 1-5, further comprising: generating, with the at least one processor, display data configured to cause a computing device to display a user interface depicting the breach likelihood score, the image visually adjacent a time scale, and a visual indicator of where in the image the breach event occurred; communicating, with the at least one processor, the display data to a merchant system; receiving, with the at least one processor, an instruction to execute a network security countermeasure from the merchant system; and executing, with the at least one processor, the network security countermeasure.

Clause 7: The computer-implemented method of any of clauses 1-6, further comprising: in response to detecting the breach event, initiating, with the at least one processor, a network security countermeasure comprising at least one of the following: declining transactions with an entity associated with the breach event; freezing at least one transaction account associated with at least one payment device associated with at least one transaction of the plurality of transactions; communicating at least one alert to a user of the at least one payment device; or any combination thereof.

Clause 8: The computer-implemented method of any of clauses 1-7, wherein an intensity value of each point of the field of points is based on a number of suspected fraudulent transactions associated with a payment device having occurred in a time subperiod.

Clause 9: The computer-implemented method of any of clauses 1-8, wherein the kernel size of the CNN model is 9×9.

Clause 10: A system comprising a server comprising at least one processor, the server programmed or configured to: receive transaction data associated with a plurality of transactions completed in a first time period; identify a set of suspected fraudulent transactions of the plurality of transactions based on inputting at least one parameter of the transaction data into a fraud evaluation model; generate an image comprising a field of points, wherein each point of the field of points is associated with at least one transaction of the set of suspected fraudulent transactions, and wherein an x-axis position in the image of each point in the field of points is associated with a time subperiod of the first time period in which the at least one transaction occurred; and detect a breach event by processing the image with a convolutional neural network (CNN) model.

Clause 11: The system of clause 10, wherein the at least one parameter comprises at least one of the following: chargeback data, reported fraud data, decline data, or any combination thereof.

Clause 12: The system of clause 10 or clause 11, wherein a y-axis position in the image of each point in the field of points corresponds to an index of a payment device of a plurality of payment devices associated with the plurality of transactions, and wherein the server is further programmed or configured to: generate a plurality of permuted images, wherein indexes of the plurality of payment devices are randomized for each of the plurality of permuted images, such that the corresponding y-axis position of each point in the field of points is also randomized in each of the plurality of permuted images; and detect the breach event by processing each of the plurality of permuted images with the CNN model.

Clause 13: The system of any of clauses 10-12, wherein detecting the breach event comprises: assigning a breach likelihood score to the image using the CNN model; comparing the breach likelihood score to a threshold score generated from evaluations of transaction data from previous time periods and other breach events; and detecting the breach event based on the breach likelihood score satisfying the threshold score.

Clause 14: The system of any of clauses 10-13, wherein the server is further programmed or configured to: generate display data configured to cause a computing device to display a user interface depicting the breach likelihood score, the image visually adjacent a time scale, and a visual indicator of where in the image the breach event occurred; communicate the display data to a merchant system; receive an instruction to execute a network security countermeasure from the merchant system; and execute the network security countermeasure.

Clause 15: The system of any of clauses 10-14, wherein the server is further programmed or configured to: in response to detecting the breach event, initiate a network security countermeasure comprising at least one of the following: declining transactions with an entity associated with the breach event; freezing at least one transaction account associated with at least one payment device associated with at least one transaction of the plurality of transactions; communicating at least one alert to a user of the at least one payment device; or any combination thereof.

Clause 16: The system of any of clauses 10-15, wherein an intensity value of each point of the field of points is based on a number of suspected fraudulent transactions associated with a payment device having occurred in a time subperiod.

Clause 17: A computer program product comprising at least one non-transitory computer-readable medium including program instructions that, when executed by at least one processor, cause the at least one processor to: receive transaction data associated with a plurality of transactions completed in a first time period; identify a set of suspected fraudulent transactions of the plurality of transactions based on inputting at least one parameter of the transaction data into a fraud evaluation model; generate an image comprising a field of points, wherein each point of the field of points is associated with at least one transaction of the set of suspected fraudulent transactions, and wherein an x-axis position in the image of each point in the field of points is associated with a time subperiod of the first time period in which the at least one transaction occurred; and detect a breach event by processing the image with a convolutional neural network (CNN) model.

Clause 18: The computer program product of clause 17, wherein a y-axis position in the image of each point in the field of points corresponds to an index of a payment device of a plurality of payment devices associated with the plurality of transactions, and wherein the program instructions further cause the at least one processor to: generate a plurality of permuted images, wherein indexes of the plurality of payment devices are randomized for each of the plurality of permuted images, such that the y-axis position of each point in the field of points is also randomized in each of the plurality of permuted images; and detect the breach event by processing each of the plurality of permuted images with the CNN model.

Clause 19: The computer program product of clause 17 or clause 18, wherein detecting the breach event comprises: assigning a breach likelihood score to the image using the CNN model; comparing the breach likelihood score to a threshold score generated from evaluations of transaction data from previous time periods and other breach events; and detecting the breach event based on the breach likelihood score satisfying the threshold score, wherein the program instructions further cause the at least one processor to: generate display data configured to cause a computing device to display a user interface depicting the breach likelihood score, the image visually adjacent a time scale, and a visual indicator of where in the image the breach event occurred; communicate the display data to a merchant system; receive an instruction to execute a network security countermeasure from the merchant system; and execute the network security countermeasure.

Clause 20: The computer program product of any of clauses 17-19, wherein the program instructions further cause the at least one processor to: in response to detecting the breach event, initiate a network security countermeasure comprising at least one of the following: declining transactions with an entity associated with the breach event; freezing at least one transaction account associated with at least one payment device associated with at least one transaction of the plurality of transactions; communicating at least one alert to a user of the at least one payment device; or any combination thereof.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments that are illustrated in the accompanying schematic figures, in which.

DETAILED DESCRIPTION

Figure 1:
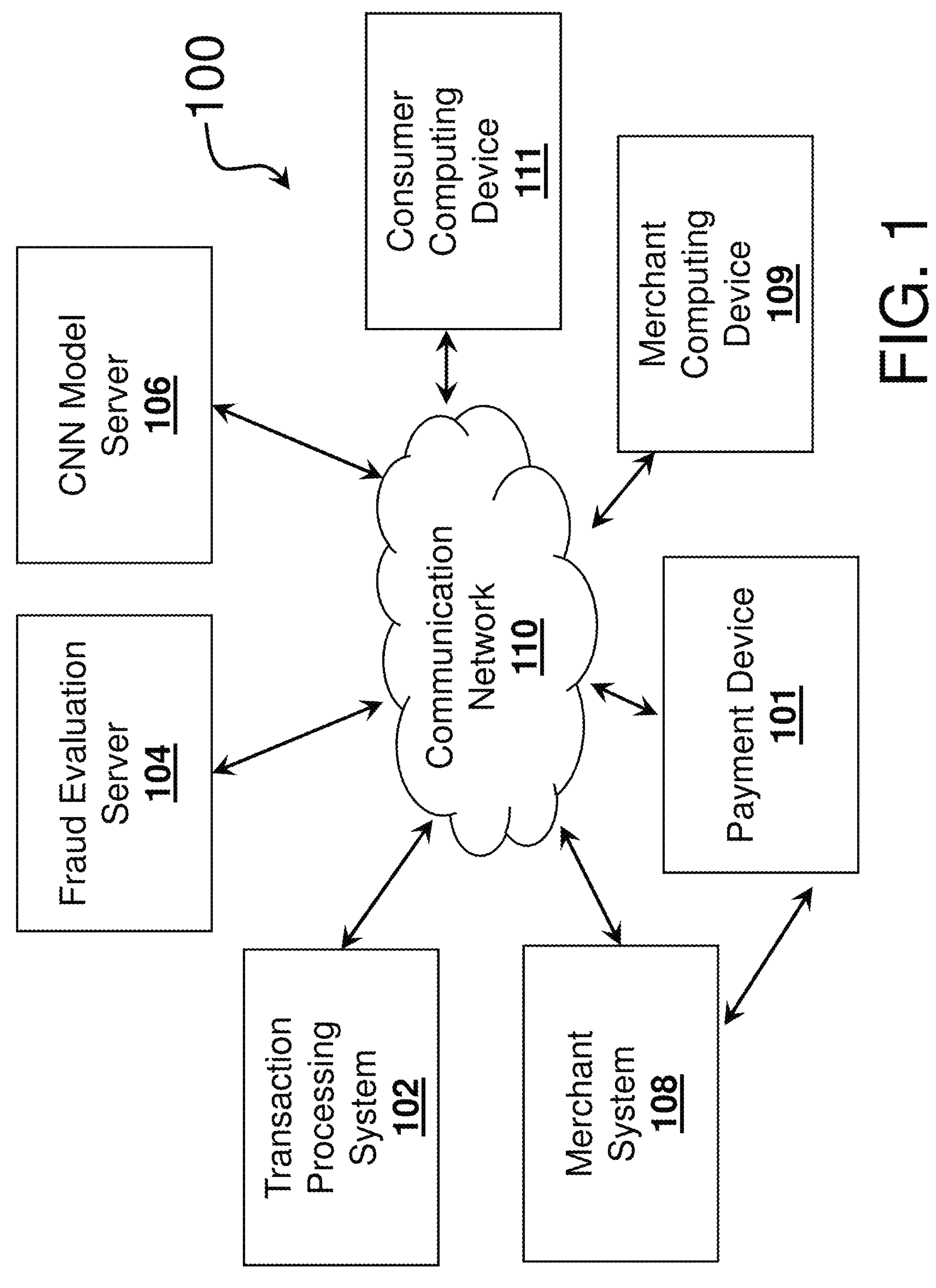
FIG. 1 is a schematic diagram of a system for breach detection using CNNs, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects of the disclosed subject matter. Hence, specific dimensions and other physical characteristics related to the embodiments or aspects disclosed herein are not to be considered as limiting.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computing device, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, an "electronic payment processing network" may refer to the communications between one or more entities for processing the transfer of monetary funds to one or more transactions. The electronic payment processing network may include a merchant system, an acquirer system, a transaction service provider, and an issuer system.

Non-limiting embodiments or aspects of the present disclosure are directed to a system, method, and computer program product for breach detection using convolutional neural networks (CNNs). The present disclosure provides a technical solution to the shortcomings of previous automated breach detection systems, which are comparatively slower and less accurate. The present disclosure provides a unique solution of generating images from transaction data so that CNNs may be deployed to detect breach events. The present disclosure includes a more efficient and closer-to-real-time detection system by analyzing individual transactions of payment devices occurring after transacting with a target entity (e.g., merchant) and detecting deviations in the images generated from received transaction data. In this manner, an entity's transaction history does not need to be compared to transaction histories of known breached entities, reducing breach response time and detection accuracy. This also reduces the computer memory required to store and/or load entity transaction history for a high number of entities. The present disclosure provides a more accurate detection system by analyzing changes in transaction behavior specific to payment devices that have interacted with the entity. Moreover, by relying on parameters such as decline data and chargeback data, a breach can be detected before consumers begin to report fraud in large enough numbers for traditional fraud systems to react.

The described improved breach detection methods result in computer network efficiencies (e.g., reduced computer processing, bandwidth, memory, etc.). In particular, the described breach detection methods reduce false positives (e.g., designating an entity as breached when said entity was not breached). False positives may make computer network functionalities unavailable for incorrectly designated entities and entities transacting with said marked entity. Moreover, the described breach detection methods reduce false negatives (e.g., designating an entity as not breached when said entity was breached). False negatives may wastefully increase computer network transaction volume. Reducing false negatives may thereby save on wasted computer resources both in processing fraudulent transactions and in rectifying the results of fraudulent transactions.

The described breach detection processes may be used to trigger automated security countermeasures (e.g., fraud mitigation programs) and may further be useful for visually representing the likelihood of breach as a product of transaction behavior over time. Earlier and more accurate breach detection provided by disclosed systems and methods not only minimize the severity of fraud resulting from breach, but it further reduces computer resource waste (e.g., processing capacity, bandwidth, number of communications) associated with fraudulent transactions and subsequent remedial measures in response to breach and fraud. Breach detection is a technically difficult problem due to the potential imbalance of data. Therefore, with potentially only a few hundred confirmed breach cases, detection may be challenging. The described systems and methods require less data or samples as input to operate successfully.

Referring now to FIG. 1, illustrated is a diagram of an example system 100 in which devices, systems, and/or methods, described herein, may be implemented. As shown in FIG. 1, system 100 includes one or more payment devices 101, transaction processing system 102, fraud evaluation server 104 (e.g., associated with a transaction service provider), convolutional neural network (CNN) model server 106 (e.g., associated with a transaction service provider), merchant system 108, merchant computing device 109, consumer computing device 111, and communication network 110.

Transaction processing system 102 may include one or more devices capable of being in communication with merchant system 108, fraud evaluation server 104, CNN model server 106, merchant computing device 109, and/or consumer computing device 111 via communication network 110. Transaction processing system 102 may include fraud evaluation server 104 and/or CNN model server 106. In some non-limiting embodiments or aspects, transaction processing system 102 may include one or more computing devices, such as a server, a group of servers, and/or other like devices. Said computing devices may include data storage devices, which may be local or remote to transaction processing system 102. In some non-limiting embodiments or aspects, transaction processing system 102 may be capable of receiving information from, storing information in, communicating information to, or searching information stored in the data storage device. Transaction processing system 102 may process and receive transaction data (e.g., transaction amount, time, merchant identifier, payment device identifier, transaction description, etc.) for transactions between payment devices 101 and merchants (e.g., merchant systems 108). Transaction processing system 102 may process and receive transaction data in a first time period (e.g., month, quarter of a year, six months, etc.) by plurality of payment devices 101 subsequent to at least an initial transaction between plurality of payment devices 101 and a merchant. In doing so, the activity of payment devices 101 after interacting with a merchant may be analyzed to determine if there has been a breach event, e.g., associated with the merchant.

Fraud evaluation server 104 may include one or more devices capable of being in communication with merchant system 108, transaction processing system 102, CNN model server 106, merchant computing device 109, and/or consumer computing device 111 via communication network 110. Fraud evaluation server 104 may be included in a same server or system as transaction processing system 102 and/or CNN model server 106. In some non-limiting embodiments or aspects, fraud evaluation server 104 may include one or more computing devices, such as a server, a group of servers, and/or other like devices. Said computing devices may include data storage devices, which may be local or remote to fraud evaluation server 104. In some non-limiting embodiments or aspects, fraud evaluation server 104 may be capable of receiving information from, storing information in, communicating information to, or searching information stored in the data storage device.

Fraud evaluation server 104 may be configured to identify one or more suspected fraudulent transactions from transactions processed by transaction processing system 102. Fraud evaluation server 104 may include one or more fraud evaluation models programmed and/or configured to categorize and/or score transactions according to a likelihood of fraud, such as based on one or more parameters of transaction data (e.g., chargeback data, reported fraud data, transaction decline data, abnormal values of transaction data, etc.). Fraud evaluation server 104 may generate a set of suspected fraudulent transactions based on a plurality of transactions and based on inputting at least one parameter of the transaction data into the fraud evaluation model. Fraud evaluation server 104 may further, in response to the detection of a breach, initiate one or more network security countermeasures, including, but not limited to: declining transactions with the entity (e.g., merchant) that has been breached; freezing (e.g., disabling one, multiple, or all functionalities of) a transaction account (e.g., credit account, debit account, etc.) associated with a payment device; communicating one or more alerts (e.g., warning messages) to one or more consumer computing devices 111 of one or more users of one or more payment devices 101; and/or the like. Network security countermeasures involving transaction accounts may be triggered in response to communication between fraud evaluation server 104 and an issuer system that manages the transaction account. Network security countermeasures may be triggered by an instruction transmitted by security personnel using merchant computing device 109 or other computing device associated with merchant system 108.

CNN model server 106 may include one or more devices capable of being in communication with merchant system 108, transaction processing system 102, fraud evaluation server 104, merchant computing device 109, and/or consumer computing device 111 via communication network 110. CNN model server 106 may be included in a same server or system as transaction processing system 102 and/or fraud evaluation server 104. In some non-limiting embodiments or aspects, CNN model server 106 may include one or more computing devices, such as a server, a group of servers, and/or other like devices. Said computing devices may include data storage devices, which may be local or remote to CNN model server 106. In some non-limiting embodiments or aspects, CNN model server 106 may be capable of receiving information from, storing information in, communicating information to, or searching information stored in the data storage device.

CNN model server 106 may be configured to generate an image from transaction data for breach analysis. The image may include a field of points, wherein each point (e.g., pixel, localized group of pixels) of the field of points is associated with at least one transaction of the set of suspected fraudulent transactions. The image may also be generated from all processed transactions, where points representing suspected fraudulent transactions are distinguished by hue, saturation, and/or brightness. An intensity value (e.g., high or low value of hue, saturation, and/or brightness) of each point may be based on a number of suspected fraudulent transactions associated with a payment device (e.g., y-axis position) having occurred in a given time subperiod (e.g., x-axis position). A high number of suspected fraudulent transactions may be correlated with a high or low intensity value for a given point, wherein the high number of suspected fraudulent transactions is determined based on a comparison to the density of transactions associated with other points in the image. The x-axis position in the image of each point in the field of points may be associated with a time subperiod (e.g., hour, day, week, etc.) of the first time period in which the transaction occurred. The y-axis position in the image of each point in the field of points may correspond to an index of payment device 101 associated with transactions along the y-axis position, such as including a unique y-axis position (e.g., row) for transactions of a given payment device 101. CNN model server 106 may be further configured to detect a breach event by processing the generated image using a CNN model, e.g., such as detecting groupings or patterns of points in the field of points (e.g., clusters along an x-axis position).

CNN model server 106 may further generate a plurality of permuted images, wherein indexes of the plurality of payment devices are randomized for each of the plurality of payment devices, such that a y-axis position of each point in a field of points is also randomized corresponding to the y-axis position of the payment device index. In doing so, the permuted images may vary by having rows of points rearranged by having different y-axis positions. The CNN model may detect breach by processing each of the permuted images and determining breach by one or more of the permuted images having patterns or groupings indicative of a breach event (e.g., clusters along an x-axis position).

CNN model server 106 may detect the breach event by assigning a breach likelihood score to the analyzed image using the CNN model. Breach may be detected by comparing the assigned breach likelihood score to a threshold score generated from evaluations of transaction data from other time periods and/or other merchants (e.g., mean score, median score, etc.). If the breach likelihood score satisfies (e.g., meets and/or exceeds) the threshold score, breach may be detected. Moreover, CNN model server 106 may generate display data configured to cause a computing device to display a user interface depicting the breach likelihood score of a given image. The image may be displayed visually adjacent a time scale, including a visual indicator of where in the image (e.g., an x-axis position, an x-axis and one or more y-axis positions, etc.) the breach occurred (e.g., displaying a box, a circle, a line, an arrow, a highlight, etc.). The display data may be communicated to merchant computing device 109.

Merchant computing device 109 may include one or more computing devices capable of being in communication with merchant system 108, transaction processing system 102, fraud evaluation server 104, CNN model server 106, and/or consumer computing device 111 via communication network 110. Merchant computing device 109 may be associated with merchant system 108 and may include a display. Merchant computing device 109 may be operated by security personnel associated with the merchant. The display may include a user interface to show breach analysis data. Merchant computing device 109 may include a display for showing a user interface to depict one or more images generated from CNN model server 106, including display data for depicting the breach likelihood score and/or visual indicators of where breach occurred.

Consumer computing device 111 may include one or more devices capable of being in communication with merchant system 108, transaction processing system 102, fraud evaluation server 104, CNN model server 106, and/or merchant computing device 109 via communication network 110. Consumer computing device 111 may be associated with a user of a payment device and may include a display. The display may include a user interface to show alerts received from fraud evaluation server 104. Consumer computing device 111 may further access and/or include an application (e.g., financial institution banking application, internet browser, etc.) for managing one or more transaction accounts that may be frozen in response to breach events.

Communication network 110 may include one or more wired and/or wireless networks. For example, communication network 110 may include a cellular network (e.g., a long-term evolution (LTE®) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, a mesh network, a beacon network, an intranet, the Internet, a fiber optic-based network, a cloud computing network, and/or the like, and/or a combination of these or other types of networks.

The number and arrangement of systems and devices shown in FIG. 1 are provided as an example. There may be additional systems and/or devices, fewer systems and/or devices, different systems and/or devices, or differently arranged systems and/or devices than those shown in FIG. 1. Furthermore, two or more devices shown in FIG. 1 may be implemented within a single system and device, or a single system or device shown in FIG. 1 may be implemented as multiple, distributed systems or devices. Additionally or alternatively, a set of systems (e.g., one or more systems) or a set of devices (e.g., one or more devices) of system 100 may perform one or more functions described as being performed by another set of systems or another set of devices of system 100.

Figure 2:
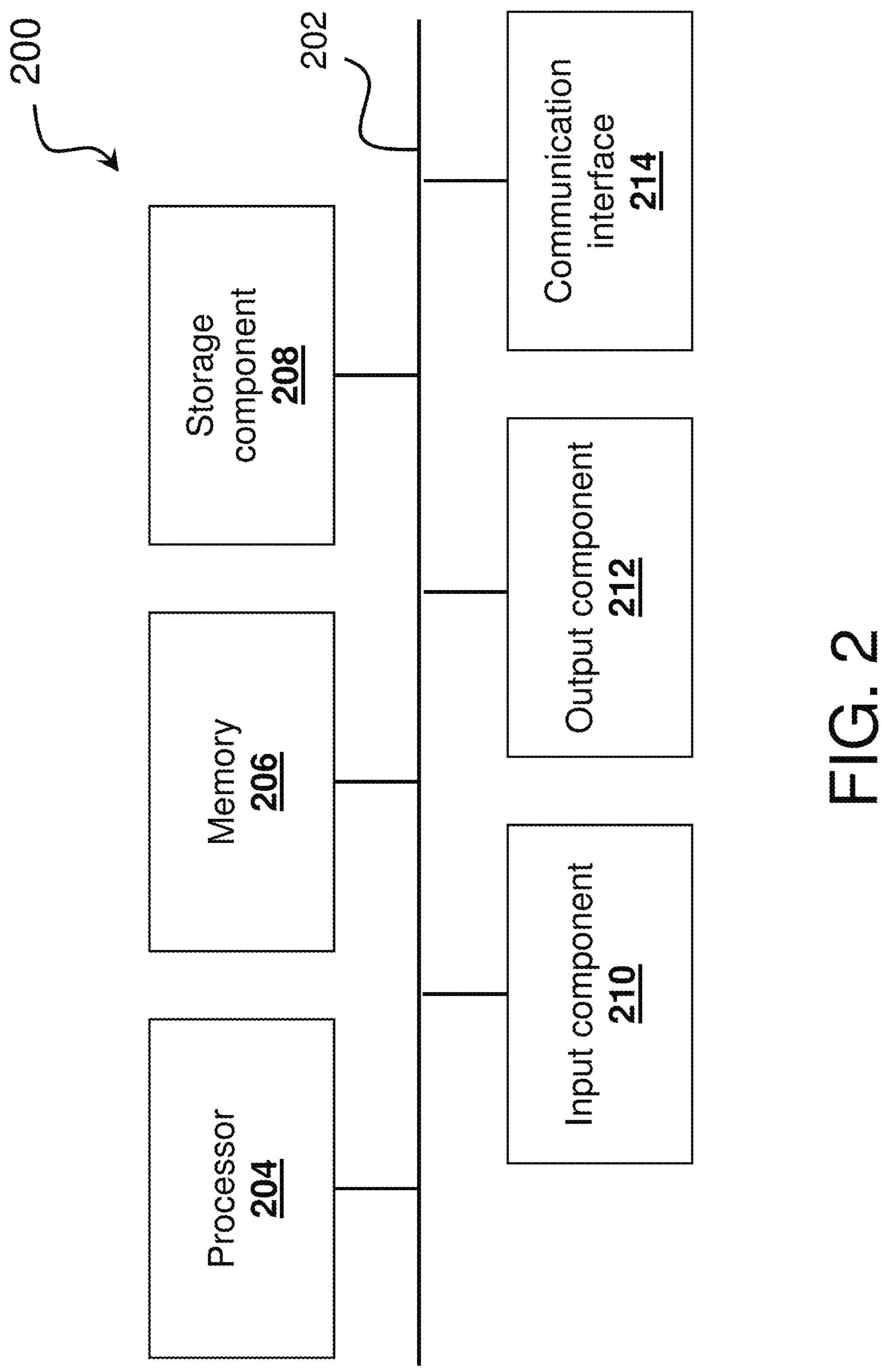
FIG. 2 is a schematic diagram of example components of one or more devices of FIG. 1, according to some non-limiting embodiments or aspects.

Referring now to FIG. 2, shown is a diagram of example components of a device 200, according to non-limiting embodiments. Device 200 may correspond to payment device 101, transaction processing system 102, fraud evaluation server 104, CNN model server 106, merchant system 108, merchant computing device 109, consumer computing device 111, and/or communication network 110, as an example. In some non-limiting embodiments, such systems or devices may include at least one device 200 and/or at least one component of device 200. The number and arrangement of components shown are provided as an example. In some non-limiting embodiments, device 200 may include additional components, fewer components, different components, or differently arranged components than those shown. Additionally, or alternatively, a set of components (e.g., one or more components) of device 200 may perform one or more functions described as being performed by another set of components of device 200.

As shown in FIG. 2, device 200 may include bus 202, processor 204, memory 206, storage component 208, input component 210, output component 212, and communication interface 214. Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

With continued reference to FIG. 2, storage component 208 may store information and/or software related to the operation and use of device 200. For example, storage component 208 may include a hard disk (e.g., a magnetic disk, an optical disk, a magneto-optic disk, a solid-state disk, etc.) and/or another type of computer-readable medium. Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.). Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium may include any non-transitory memory device. A memory device includes memory space located inside of a single physical storage device or memory space spread across multiple physical storage devices. Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

Figure 3:
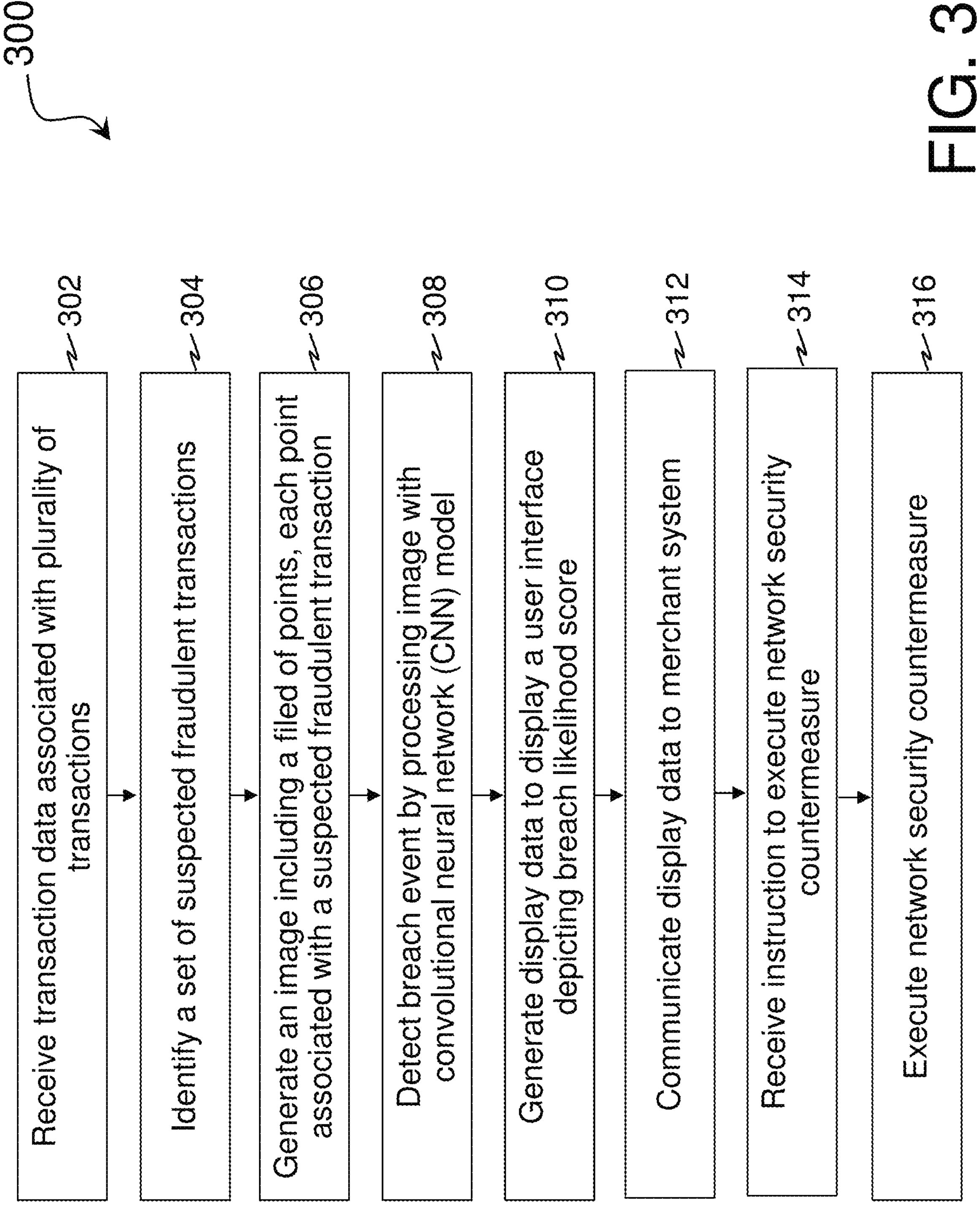
FIG. 3 is a flow diagram of a method for breach detection using CNNs, according to some non-limiting embodiments or aspects.

Referring now to FIG. 3, shown is a flow diagram for a method for breach detection using CNNs, according to some non-limiting embodiments or aspects. The steps shown in FIG. 3 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. Process 300 may be executed by one or more processors of transaction processing system 102, fraud evaluation server 104, CNN model server 106, and/or other computing device. One step of process 300 may be executed by a same or different processor as another step of process 300.

As shown in FIG. 3, at step 302, process 300 may include receiving transaction data. For example, transaction processing system 102 may receive transaction data associated with a plurality of transactions by a plurality of payment devices in a first time period. The first time period may be subsequent to the plurality of payment devices transacting with a merchant. Analyzing transaction data for a plurality of payment devices in a time period subsequent to the plurality of payment devices transacting with a merchant allows for earlier and more accurate detection of breach, which may avoid waste of computer resources (e.g., processing capacity, bandwidth, etc.) as a result of fraudulent transactions due to a breached merchant going undetected.

As shown in FIG. 3, at step 304, process 300 may include identifying a set of suspected fraudulent transactions. For example, fraud evaluation server 104 may identify a set of suspected fraudulent transactions of the plurality of transactions based on inputting one or more parameters of the transaction data into a fraud evaluation model. The fraud evaluation model may include a machine learning model trained on historic, confirmed fraudulent transaction data and may be used to detect fraudulent transactions based on one or more parameters (e.g., chargeback data, reported fraud data, decline data, abnormal values of transaction data, etc.) of the transaction data. Each transaction may be individually assigned a score of likelihood of fraud, and the score may be compared to a threshold score (e.g., generated from historic scores, such as to minimize false positives and/or false negatives). Transactions having scores that satisfy the threshold score may be included in the set of suspected fraudulent transactions.

As shown in FIG. 3, at step 306, process 300 may include generating an image including a field of points from the transaction data. For example, CNN model server 106 may generate an image including a field of points, where each point of the field of points is associated with at least one transaction of the set of suspected fraudulent transactions. An intensity value (e.g., of hue, saturation, and/or brightness) of each point of the field of points may be based on (e.g., proportional to) a number of suspected fraudulent transactions associated with a payment device having occurred in a given time subperiod. Moreover, an x-axis position in the image of each point in the field of points may be associated with a time subperiod of (e.g., in) the first time period in which the at least one transaction occurred. A y-axis position in the image of each point in the field of points may correspond to an index of a payment device of the plurality of payment devices with which associated transactions were completed (e.g., y-axis position value of 1 for an index of 1, etc.). For example, each payment device may include a row of points of suspected fraudulent transactions having been made with the payment device.

As shown in FIG. 3, at step 308, process 300 may include detecting a breach event. For example, CNN model server 106 may detect the breach event by processing the generated image with a CNN model. The CNN model may include one or more CNN machine learning algorithms trained on historic generated images of confirmed breach events, such that the CNN model may detect breaches based on images having similar patterns of points. CNN model server 106 may, to detect a breach event, generate and assign a breach likelihood score to a generated image using the CNN model, comparing the breach likelihood score to a threshold score generated from evaluations of transaction data from previous time periods and/or other breach events (e.g., of merchants), and detecting the breach event based on the breach likelihood score satisfying the threshold score. The CNN model may use a kernel of size 3×3, 5×5, 7×7, 9×9, etc. The described systems and methods may use larger kernel sizes (e.g., 9×9) to increase CNN model performance (e.g., as measured by area under the curve (AUC) scores), which may also result in computational efficiencies resulting from fewer false positives/negatives.

As shown in FIG. 3, at step 310, process 300 may include generating display data for the display of a user interface to depict breach likelihood score and/or generated images. For example, CNN model server 106 may generate display data configured to cause a computing device to display a user interface depicting the breach likelihood score, the image visually adjacent a time scale (e.g., displayed on an x-axis), and a visual indicator of where in the image the breach occurred.

As shown in FIG. 3, at step 312, process 300 may include communicating the display data to a merchant system. For example, CNN model server 106 may communicate the display data to a merchant system (e.g., merchant computing device 109) of a merchant that has been breached, for display to security personnel. The computing device of the merchant system may receive the display data and display, in a user interface, the breach likelihood score, image, and visual indicator according to the display data. The computing device of the merchant system may receive or display only the image or the image and the visual indicator.

As shown in FIG. 3, at step 314, process 300 may include receiving an instruction to execute a network security countermeasure. For example, CNN model server 106 may receive an instruction to execute a network security countermeasure from the merchant system. Network security countermeasures may include, but are not limited to: declining transactions with an entity associated with the breach event (e.g., a merchant); freezing at least one transaction account associated with at least one payment device associated with at least one transaction of the plurality of transactions; communicating at least one alert to a user of the at least one payment device; or any combination thereof.

As shown in FIG. 3, at step 316, process 300 may include executing the network security countermeasure. For example, CNN model server 106 may execute the network security countermeasure. The execution of the network security countermeasure may be triggered in response to receipt of the instruction in step 314. Additionally or alternatively, CNN model server 106 may execute network security countermeasures automatically.

Figure 4:
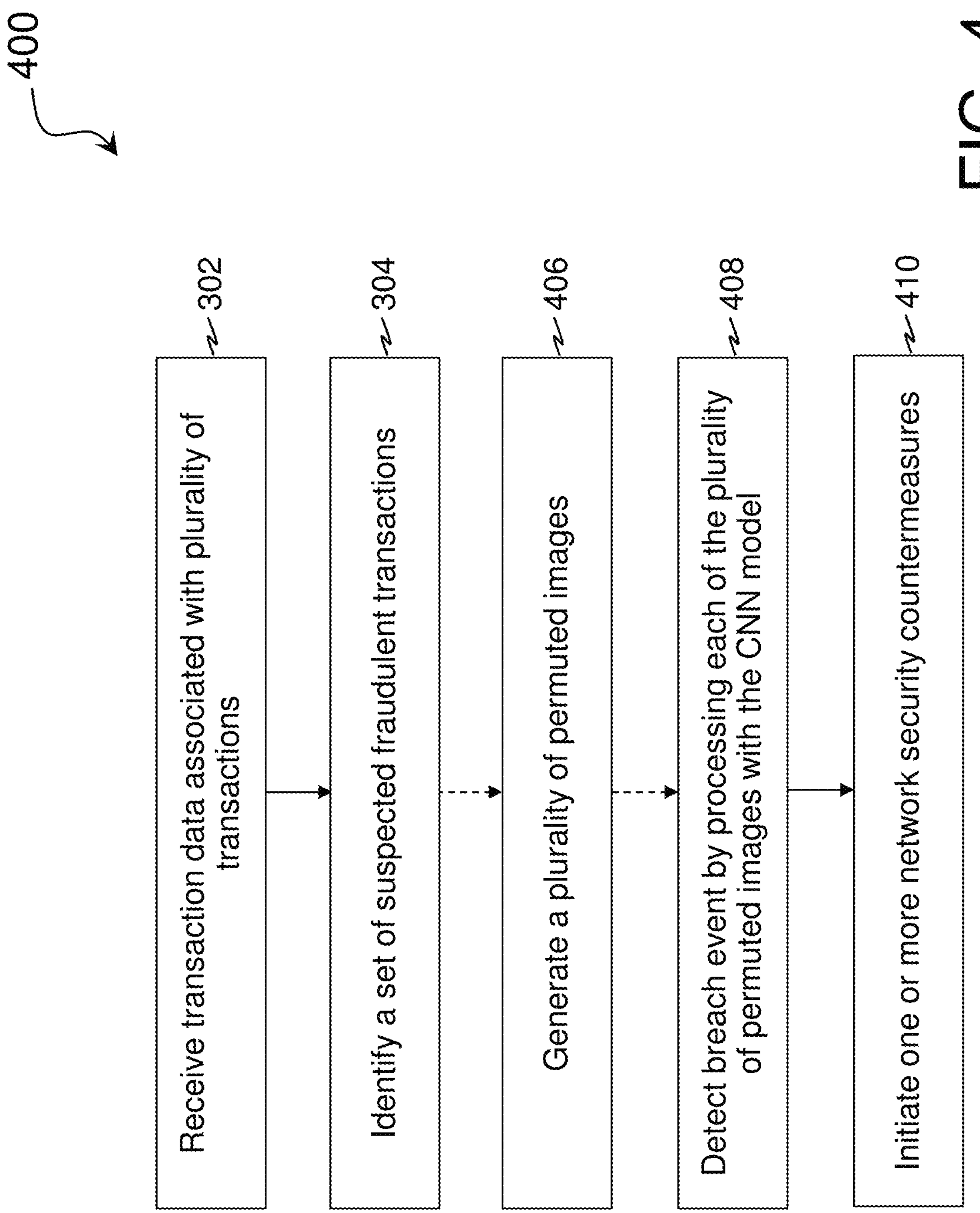
FIG. 4 is a flow diagram of a method for breach detection using CNNs, according to some non-limiting embodiments or aspects.

Referring now to FIG. 4, shown is a flow diagram for a method for breach detection using CNNs, according to some non-limiting embodiments or aspects. The steps shown in FIG. 4 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. Process 400 may be executed by one or more processors of transaction processing system 102, fraud evaluation server 104, CNN model server 106, and/or other computing device. One step of process 400 may be executed by a same or different processor as another step of process 400.

As shown in FIG. 4, at step 302, process 400 may include receiving transaction data. For example, transaction processing system 102 may receive transaction data associated with a plurality of transactions by a plurality of payment devices in a first time period. The first time period may be subsequent to the plurality of payment devices transacting with a merchant.

As shown in FIG. 4, at step 304, process 400 may include identifying a set of suspected fraudulent transactions. For example, fraud evaluation server 104 may identify a set of suspected fraudulent transactions of the plurality of transactions based on inputting one or more parameters of the transaction data into a fraud evaluation model.

As shown in FIG. 4, at step 406, process 400 may include generating a plurality of permuted images. For example, CNN model server 106 may generate, in addition to or including the image generated in step 306 of FIG. 4, a plurality of permuted images, wherein indexes of the plurality of payment devices are randomized for each of the plurality of permuted images, such that the corresponding y-axis position of each point in the field of points is also randomized in each of the plurality of permuted images. In doing so, the y-axis position of each point in the field of points for each of the plurality of permuted images may be rearranged. By way of further example, each row of points corresponding to transactions of one payment device may have a different y-axis in each permuted image.

As shown in FIG. 4, at step 408, process 400 may include detecting a breach event by processing each of the plurality of permuted images with the CNN model. For example, CNN model server 106 may detect a breach event by processing each of the permuted images with the CNN model. A determination of breach may be based on one or more of the permuted images being classified as indicating breach (e.g., a likelihood of breach) by the CNN model.

As shown in FIG. 4, at step 410, process 400 may include initiating one or more network security countermeasures. Step 410 may likewise be executed in response to the detection of breach in step 408 of FIG. 4. For example, fraud evaluation server 104 may initiate one or more network security countermeasures, including, but not limited to: declining transactions with the entity (e.g., merchant) that has been breached; freezing (e.g., disabling one, multiple, or all functionalities of) a transaction account (e.g., credit account, debit account, etc.) associated with a payment device; communicating one or more alerts (e.g., warning messages) to one or more consumer computing devices 111 of one or more users of one or more payment devices 101; and/or the like. Network security countermeasures involving transaction accounts may be triggered in response to communication between fraud evaluation server 104 and an issuer system that manages the transaction account.

Figure 5:
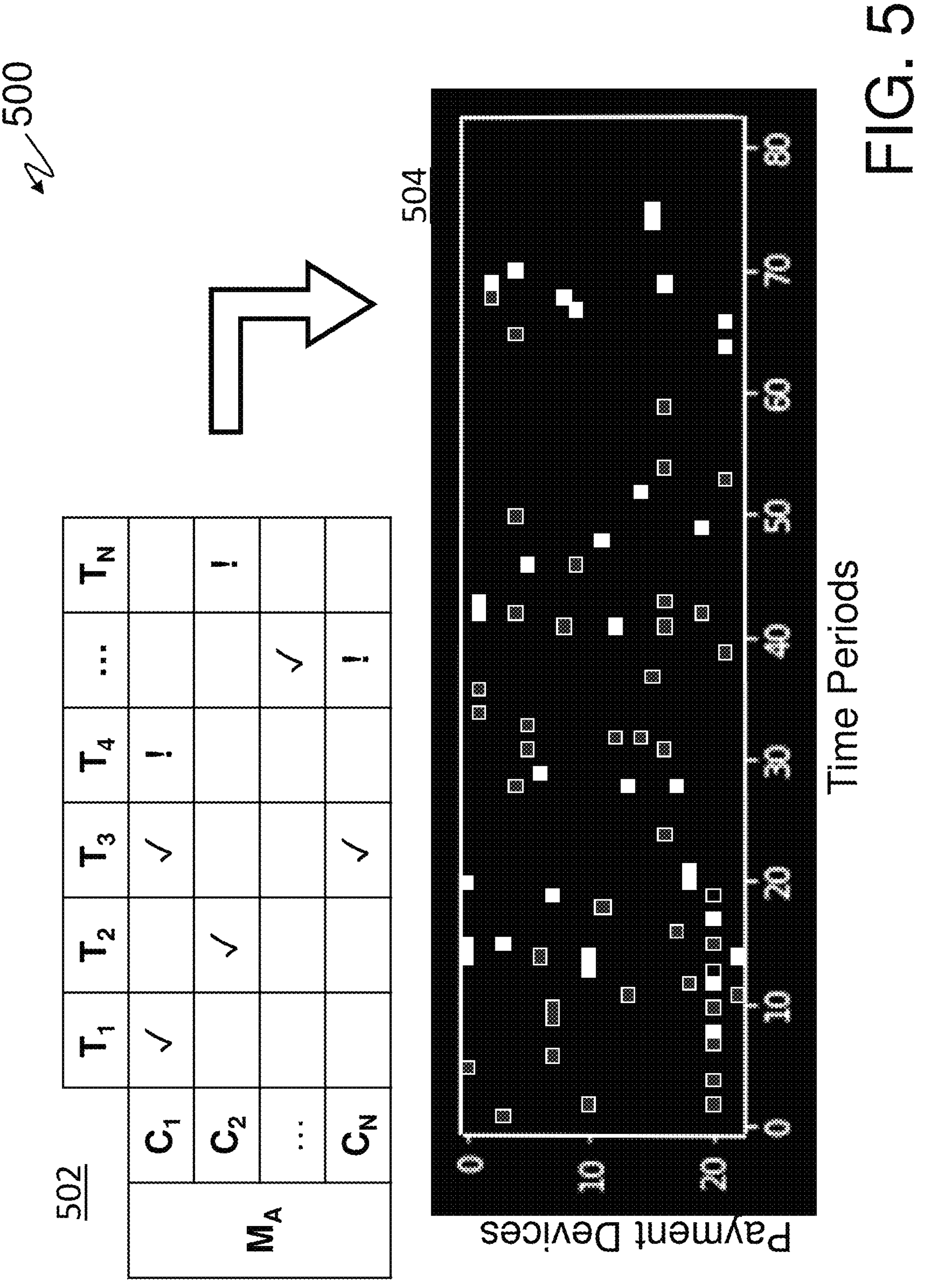
FIG. 5 is an illustrative diagram of a method for breach detection using CNNs, according to some non-limiting embodiments or aspects.

Referring now to FIG. 5, shown is an illustrative diagram for a method of breach detecting using CNNs, according to some non-limiting embodiments or aspects. The steps shown in FIG. 5 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. Process 500 may be performed by one or more processors of CNN model server 106 or other computing device. One step of process 500 may be executed by a same or different processor as another step of process 500.

As shown in FIG. 5, at step 502, process 500 may include tabulating received transaction data. For example, CNN model server 106 may tabulate received transaction data into rows corresponding to payment devices ($C_1, C_2, \ldots C_N$) and columns corresponding to time subperiods ($T_1, T_2, T_3, T_4, \ldots T_N$). A cell of the tabulated data may represent a categorization for transactions completed in a given time subperiod for the payment device. For example, transactions associated with a cell may be evaluated by fraud evaluation server 104 and may be scored based on fraud likelihood. If transactions associated with a cell are not likely to be fraudulent, the cell may be given an indicator of normal transaction behavior. As shown in step 502, cells of the table are marked with a checkmark to show normal transaction behavior. If one or more transactions associated with a cell are likely to be fraudulent, the cell may be given an indicator of abnormal transaction behavior. As shown in step 502, cells of the table are marked with an exclamation point to shown abnormal transaction behavior. It will be appreciated that an additional indicator may be used to indicate a mixture of normal and abnormal transaction behavior. The tabulated transaction data may be generated for one or more entities involved in the transactions (e.g., transaction accounts, issuers, acquirers, merchants).

As shown in FIG. 5, at step 504, process 500 may include generating, from the tabulated transaction behavior, an image for transaction activity with a given entity. For example, CNN model server 106 may generate an image for the entity including a field of points. Each point may have an x-axis of time subperiod in which associated transactions were completed. Each point may have a y-axis of payment device index. The image may be generated such that only points indicative of suspected fraudulent transactions may be shown. As shown, points indicating normal transaction behavior are grey, points indicating abnormal transaction behavior are black, and points indicating a mixture of normal and abnormal transaction behavior are white. It will be appreciated that the points may be visually represented by other variations of distinctive hue, saturation, and/or brightness. It will also be appreciated that while a visible and labeled set of axes are shown for step 504, such as in a user interface, the image within the rectangle may be what is analyzed by a CNN model.

Figure 6:
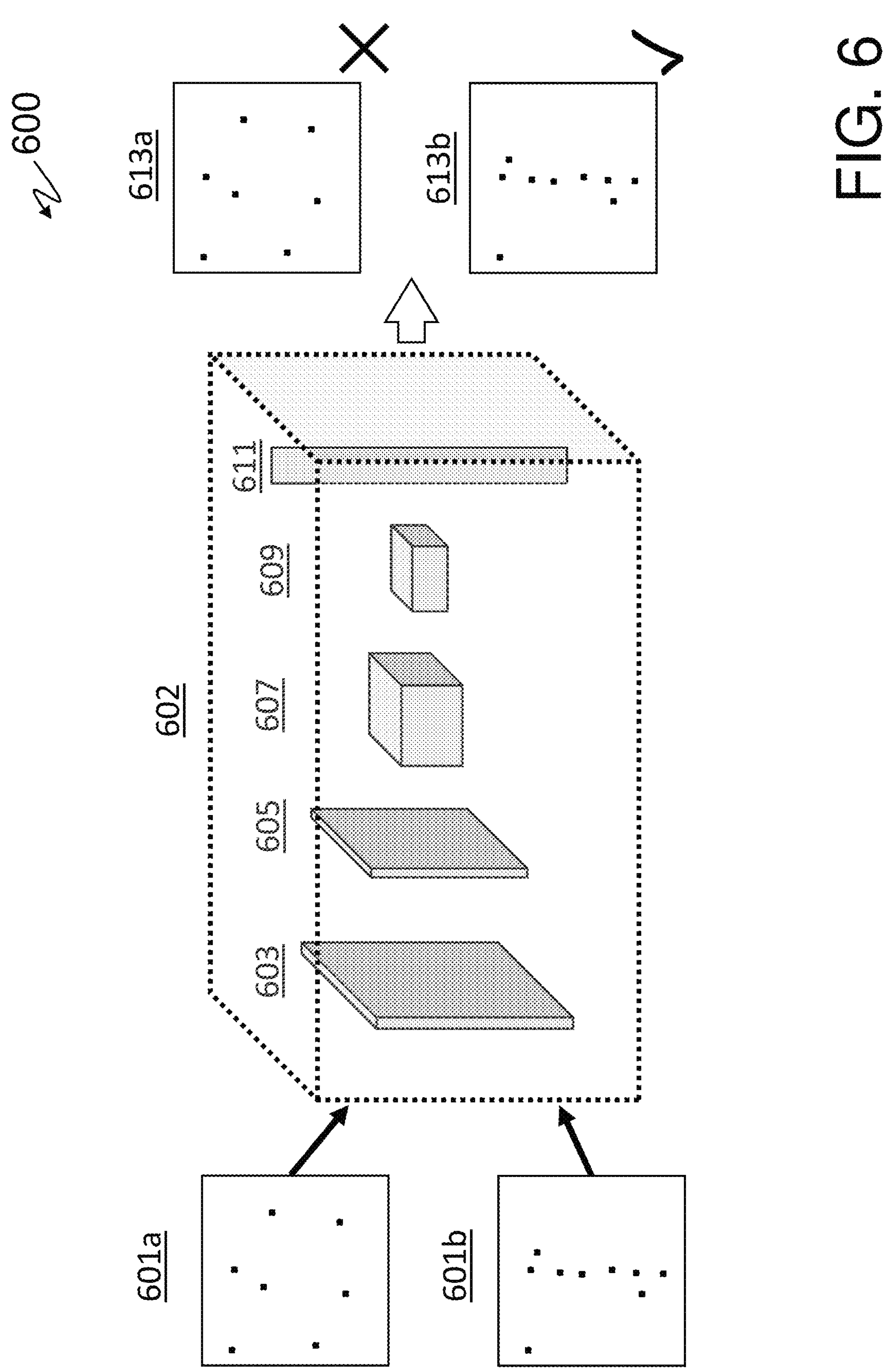
FIG. 6 is an illustrative diagram of a method for breach detection using CNNs, according to some non-limiting embodiments or aspects.

Referring now to FIG. 6, shown is an illustrative diagram for a method of breach detection using CNNs, according to some non-limiting embodiments or aspects. The steps shown in FIG. 6 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. Process 600 may be performed by one or more processors of CNN model server 106 or other computing device. One step of process 600 may be executed by a same or different processor as another step of process 600.

Layers 603, 605, 607, 609, and 611 are shown to represent an exemplary CNN model 602 for feature classification, which may be used to detect features in an image. CNN model 602 may receive input layer 601*a*, 601*b*. As shown, first input layer 601*a* represents an image generated from a non-breach event, and second input layer 601*b* represents an image generated from a breach event. Each input layer 601*a*, 601*b* may be separately classified. After input layer 601*a*, 601*b*, CNN model 602 may include first convolutional layer 603 to generate a feature map of input layer 601*a*, 601*b*. CNN model 602 may include first pooling layer 605 to down-sample the generated feature map by summarizing the presence of features in patches of the feature map. CNN model 602 may further include a second convolutional layer 607 to generate a second feature map using the down-sampled first feature map as an input layer. CNN model 602 may further include second pooling layer 609 to down-sample the second generated feature map. Finally, CNN model 602 may include fully connected layer 611 to take the input volume of second pooling layer 609 and output a dimensional vector to represent a classification. As shown, first classification 613*a* of first input layer 601*a* may represent a non-breach event, and second classification 613*b* of second input layer 601*b* may represent a breach event. It will be appreciated that other combinations of convolutional layers, pooling layers, and rectified linear unit layers may be used to generate a classification from initial input layers 601*a*, 601*b*.

Figure 7:
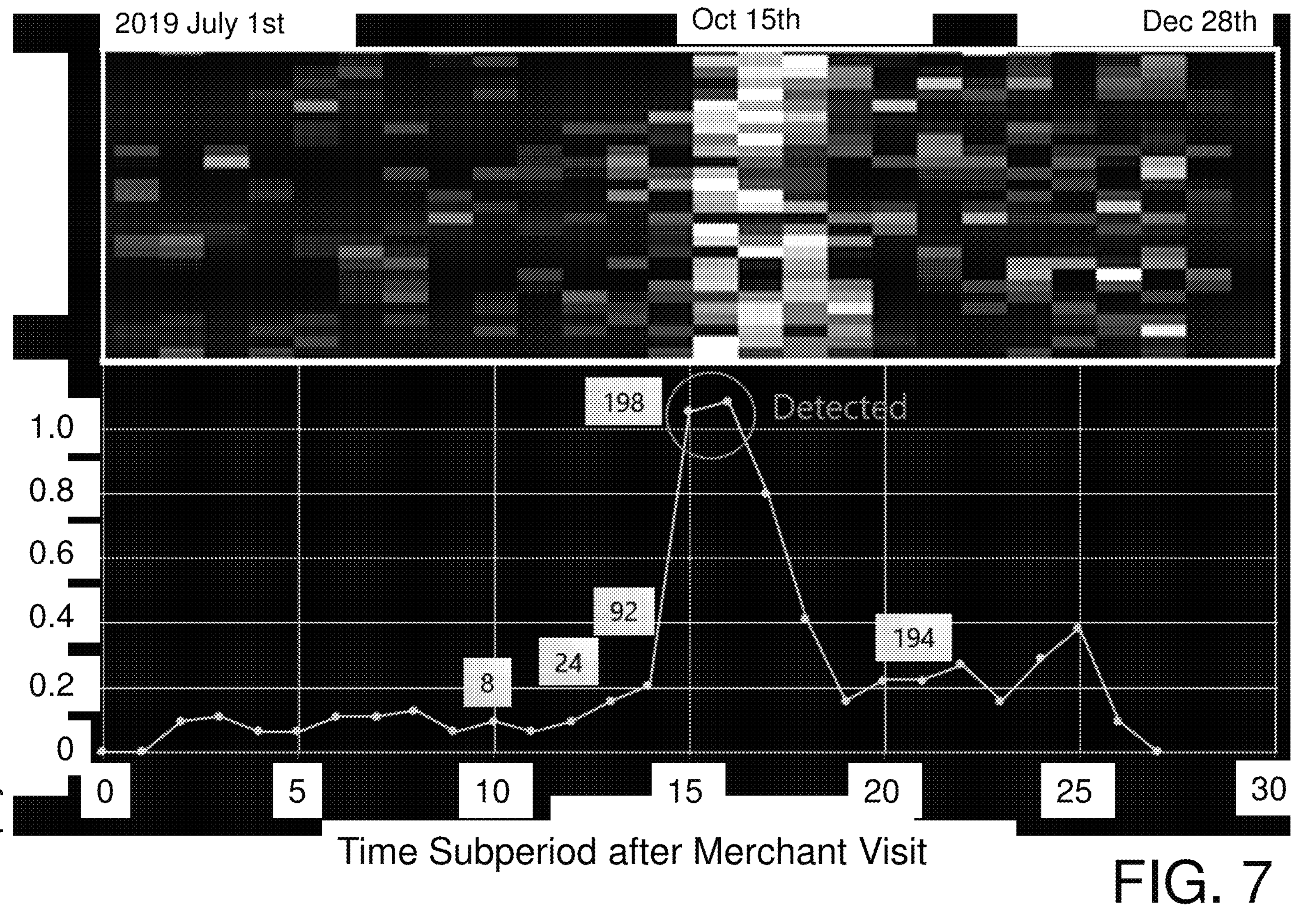
FIG. 7 is an illustrative diagram of a method for breach detection using CNNs, according to some non-limiting embodiments or aspects.

Referring now to FIG. 7, shown is an illustrative diagram for a method of breach detection using CNNs, according to some non-limiting embodiments or aspects. Shown is an exemplary user interface that may display the results of breach analysis according to systems and methods described herein. Illustrated in the top half of the user interface is an image generated by CNN model server 106 using transaction data of a breached merchant entity. The image includes an accompanying timeline above to shown the evaluated time period. The image includes a field of points. As shown, the darker a point on the field of points, the higher value (e.g., number, ratio, fraud score, etc.) of fraudulent transactions associated with a payment device in a given time period. The lower half of the user interface displays a chart with a percent of payment devices having bad transactions plotted on a y-axis, and time subperiod (e.g., week) after merchant visit (e.g., time since payment device made a purchase at the merchant) plotted on the x-axis. As shown, there is a peak in percentage of payment devices having bad transactions approximately overlapping with a clustered pattern in the generated image above. The line graph includes numbers of payment devices with fraudulent transactions shown in white text on black labels along corresponding points in the line graph. The user interface further includes a visual indicator of where in the image the breach occurred, namely, a circle labeled "Detected", which aligns with an x-axis position in the image. It will be appreciated that the visual indicator may be overlaid on the generated image itself and may include other types of indicators, including rectangles, lines, arrows, highlights, and/or the like.

Figure 8:
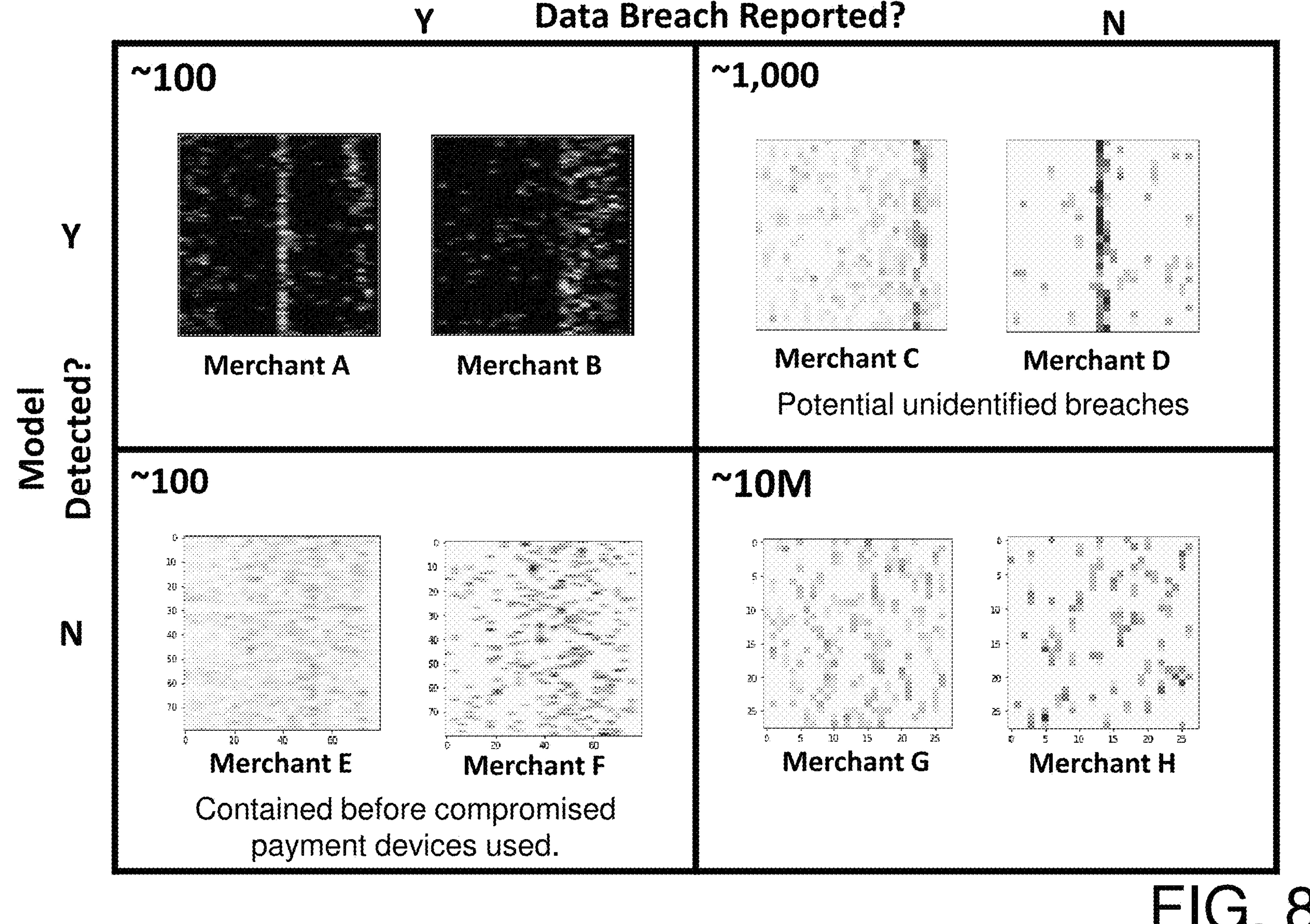
FIG. 8 is an illustrative diagram of a method for breach detection using CNNs, according to some non-limiting embodiments or aspects.

Referring now to FIG. 8, shown is an illustrative diagram of a method for evaluating the performance of methods for breach detection using CNNs, according to some non-limiting embodiments or aspects. Shown is a matrix with two categories on each axis, where the y-axis represents scenarios where a tested CNN model detected a breach, delineated by "yes" (Y) and "no" (N), and the x-axis represents scenarios where a data breach was actually reported, delineated by "yes" (Y) and "no" (N).

The first (upper left) quadrant represents a proportion of total analyzed merchants (approximately 100) where a data breach was reported and CNN model server 106 successfully detected the breach. Depicted in the first quadrant are two exemplary generated images (Merchant A and Merchant B) analyzed by CNN model server 106. The images of the first quadrant exemplify clustered patterns in the generated images that were detected by the CNN model as indicative of breach.

The second (upper right) quadrant represents a proportion of total analyzed merchants (approximately 1000) where a data breach was not reported, but CNN model server 106 detected a breach. The second quadrant may indicate merchants where breaches went unidentified by other means, resulting in non-reported breaches. Depicted in the second quadrant are two exemplary generated images (Merchant C and Merchant D) analyzed by CNN model server 106. The images of the second quadrant exemplify clustered patterns in the generated images that were detected by the CNN model as indicative of breach.

The third (lower left) quadrant represents a proportion of total analyzed merchants (approximately 100) where a data breach was reported, but CNN model server 106 did not detect a breach. The third quadrant may indicate merchants that detected and contained a breach before the compromised payment devices were used by the agents associated with the breach. Depicted in the third quadrant are two exemplary generated images (Merchant E and Merchant F) analyzed by CNN model server 106. The images of the third quadrant exemplify a lack of clustered patterns in the generated images that would have been detected by the CNN model as indicative of breach.

The fourth (lower right) quadrant represents a proportion of total analyzed merchants (approximately 10 million) where a data breach was neither reported nor detected by CNN model server 106. Depicted in the fourth quadrant are two exemplary generated images (Merchant G and Merchant H) analyzed by CNN model server 106. The images of the fourth quadrant exemplify a lack of clustered patterns in the generated images that would have been detected by the CNN model as indicative of breach.

Figure 9:
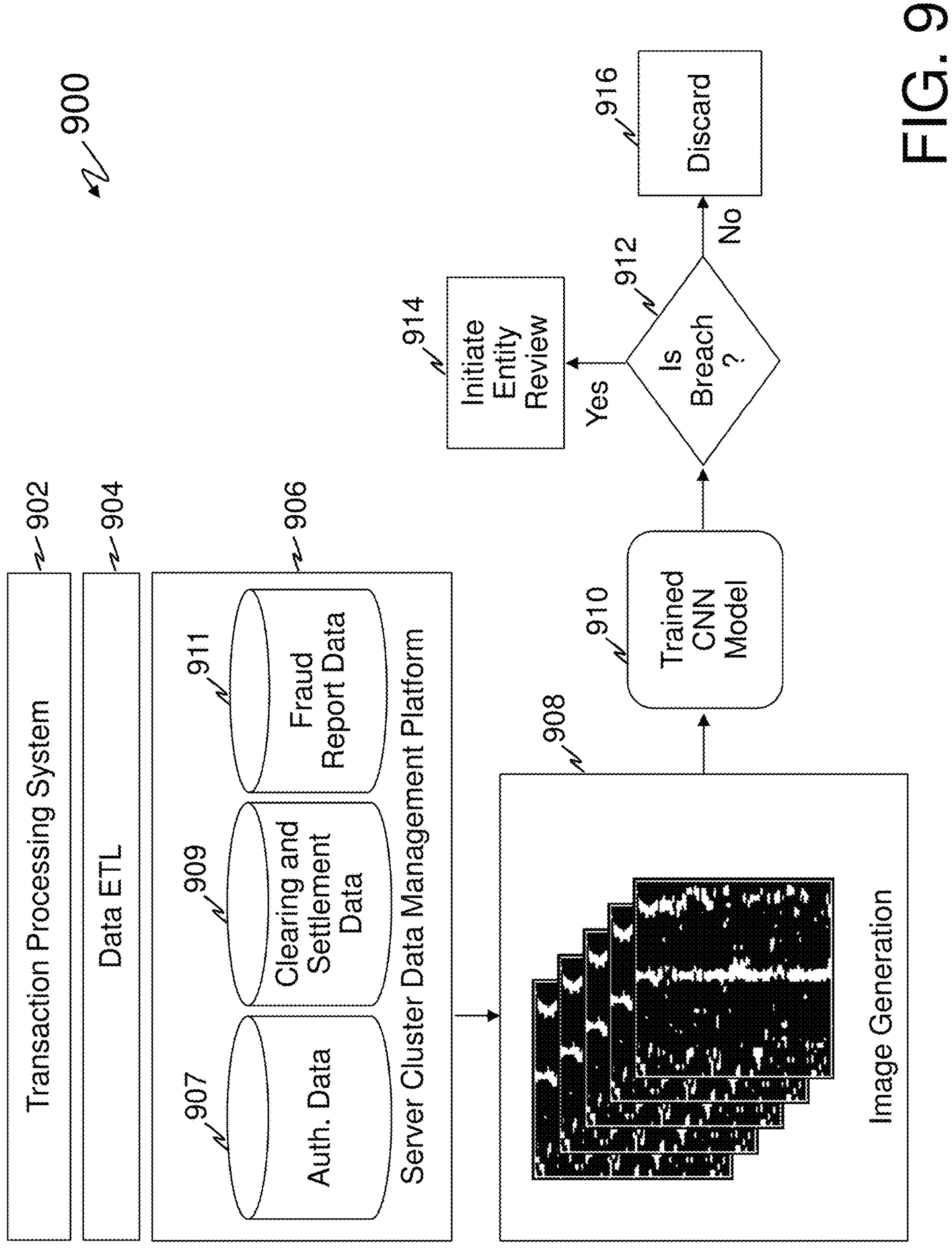
FIG. 9 is a flow diagram of a method for breach detection using CNNs, according to some non-limiting embodiments or aspects.

Referring now to FIG. 9, shown is a flow diagram for a method of breach detection using CNNs, according to some non-limiting embodiments or aspects. The steps shown in FIG. 9 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. Process 900 may be executed by one or more processors of transaction processing system 102, fraud evaluation server 104, CNN model server 106, and/or other computing device. One step of process 900 may be executed by a same or different processor as another step of process 900.

As shown in FIG. 9, at step 902, process 900 may include processing transactions. For example, transaction processing system 102 may process transactions, thereby receiving transaction data associated with a plurality of transactions by a plurality of payment devices in a first time period. The first time period may be subsequent to the plurality of payment devices transacting with an entity (e.g., a merchant).

As shown in FIG. 9, at step 904, process 900 may include extracting the transaction data. For example, a data extract, transform, load (ETL) engine of transaction processing system 102 may copy the transaction data from one or more sources into associated databases in a format for use in breach detection.

As shown in FIG. 9, at step 906, process 900 may include distributing the transaction data to a server cluster data management platform. For example, transaction processing system 102 may include a server cluster data management platform, such as a Hadoop data lake. The server cluster data management platform may include one or more servers for storing transaction authorization data 907, transaction clearing and settlement data 909, and transaction fraud reporting data 911.

As shown in FIG. 9, at step 908, process 900 may include using the transaction data to generate one or more images for use in breach detection. For example, CNN model server 106 may generate one or more images for each analyzed entity, according to the above-described systems and methods. The images may be used as input layers for trained CNN model 910 to produce a classification.

As shown in FIG. 9, at step 912, process 900 may include making a determination of breach based on the classification of trained CNN model 910. For example, CNN model server 106 may determine if a merchant experienced a breach based on analyzing one or more generated images for said merchant. If breach is not detected in step 912, the image may be discarded in step 916 and no further action may be taken. However, if breach is detected in step 912, then entity review may be initiated in step 914. For example, CNN model server 106 may generate display data configured to cause a display of merchant computing device 109 to display a user interface including at least the generated image, for use by a merchant to evaluate the analysis. Additionally or alternatively, CNN model server 106 may communicate with fraud evaluation server 104 to initiate one or more network security countermeasures based on the detection of a breach.

Statistical Modeling and CNN Setup

Anomalous events (e.g., breach events) may be modeled for various types of primary entities (e.g., merchants, payment device holders, transaction accounts, issuers, acquirers, etc.) based on the transaction data of sub-entities (e.g., payment devices, transaction accounts, etc.). The occurrence of an anomalous event may be represented by the below formula, where s is sub-entity, t is time period, and n is number of sub-entities, where the occurrence is a discrete indicator random variable, $F_s$, where:

$$F_S(t) = \begin{cases} 1 & w.p.\ p_S(t), \\ 0 & w.p.\ 1 - p_S(t). \end{cases} \quad \text{Formula 1}$$

For the given primary entity, the total number of X anomalous events occurred out of n sub-entities at given time period t is a random variable that follows the distribution below:

$$P(X = k, t) = \sum_{s=1}^{n} F_S(t) = \binom{n}{k} \prod_{s=1}^{k} p_S(t) \prod_{s=k+1}^{n} (1 - p_S(t)). \quad \text{Formula 2}$$

A time range from $t_{start}$ to $t_{end}$ (e.g., inclusively) may be defined as an anomaly exposure time window. Given that, the probability of an anomalous event of an anomalous primary entity satisfies the following formula:

$$P(X = k, t \in [t_{start}, t_{end}]) >= P(X = k, t \notin [t_{start}, t_{end}]). \quad \text{Formula 3}$$

The methodologies described herein have been tested using both real transaction data and synthetic data. The described methods outperform other techniques and the true positive to false positive ratio has been demonstrated to be improved as approximately twice as large as other machine learning methods. Table 1, shown below, illustrates the result of model performance for various methods, including the methods described herein (labeled "CNN-IMG"), as tested on synthetically generated data (substituted for real transaction data for to maintain data privacy). Two variations of the described methods herein were evaluated and are shown in Table 1. Other models compared include a logistic regression model, a k-nearest neighbors (KNN) model, a random forest model, a support vector machine (SVM) model, and a one-dimensional CNN model. Performance is shown by area under the curve (AUC) score (higher is better) and the standard deviation (STD) thereof.

TABLE 1

| Classifier | AUC | STD |
|---|---|---|
| Logistic Regression | 0.86747 | — |
| KNN | 0.92042 | — |
| Random Forest | 0.92639 | 0.0023 |
| SVM (rbf kernel) | 0.95419 | — |
| CNN-1D | 0.95213 | 0.0033 |
| CNN-IMG w/o Card-Vol | 0.94498 | 0.0029 |
| CNN-IMG w/Card-Vol | 0.95004 | 0.0038 |

In some non-limiting embodiments or aspects, an advantage of using images as input is that the rows of images may be permuted to generate more augmented data, which may be valuable for imbalanced datasets where positive samples are much fewer than negative ones. In this manner, the unsampled data may contain the same rich information as the original dataset. For each positive image, there may be generated up to N! individual images (where N is number of rows). This is a scalable way to generate thousands of positive samples without introducing irrelevant information for each sample. This data augmentation achieved by permutation of the rows may also be considered as regulation for over-fitting. The local point (e.g., pixel) features may be shuffled and only the global change of features may be of importance.

Figure 10:
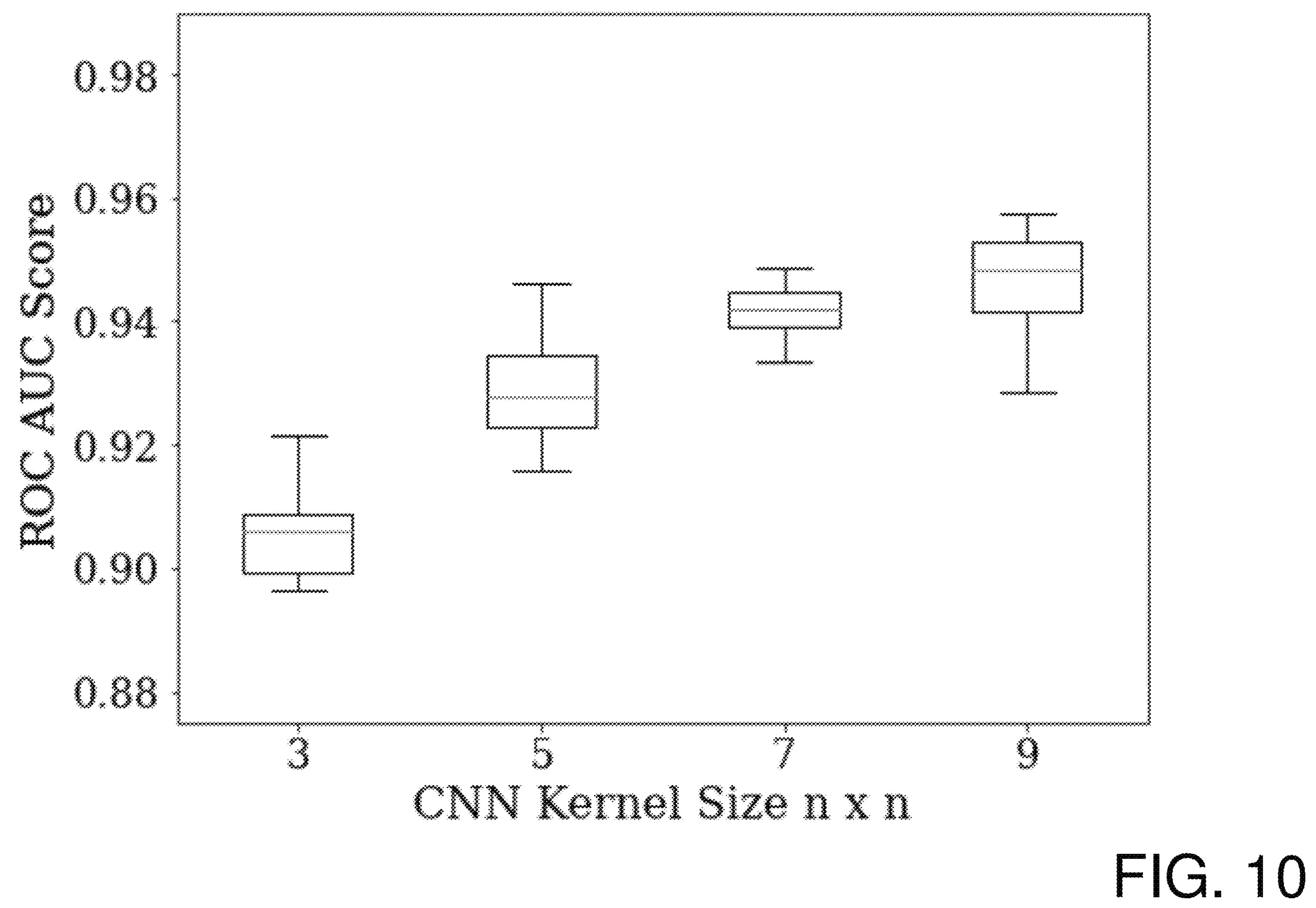
FIG. 10 is a box-and-whisker plot of CNN model performance as a factor of CNN kernel size, according to non-limiting embodiments or aspects of methods for breach detection using CNNs.

Similar regulation may be achieved by increasing the CNN kernel size as well. With specific reference to FIG. 10, shown is a box-and-whisker plot of CNN model performance as a factor of CNN kernel size, as tested. As shown, a larger kernel size can provide more information globally. Four different kernel sizes (3×3, 5×5, 7×7, and 9×9) were empirically evaluated to determine that better performance may be achieved with a larger kernel size. The y-axis of FIG. 10 represents the receiver operating characteristic (ROC) AUC score, and the x-axis of FIG. 10 represents the CNN kernel size (n×n).

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system comprising:

at least one processor configured to:

generate a plurality of permuted images, wherein each image of the plurality of permuted images comprises a field of points, wherein each point of the field of points is associated with at least one transaction of a set of suspected fraudulent transactions, wherein the field of points is distinguished in the image by at least one of hue, saturation, or brightness, wherein an x-axis position in the image of each point in the field of points is associated with a time subperiod of a first time period in which the at least one transaction occurred, and wherein a y-axis position in the image of each point in the field of points corresponds to a randomized index of a payment device of a plurality of payment devices associated with a plurality of transactions completed with an entity;

assign a breach likelihood score to each image of the plurality of permuted images using a convolutional neural network (CNN) model and based on patterns in the field of points of the image;

compare the breach likelihood score of each image of the plurality of permuted images to a threshold score generated from evaluations of transaction data from previous time periods and other breach events;

detect the breach event based on one or more breach likelihood scores of the plurality of permuted images satisfying the threshold score; and in response to detecting the breach event, decline transactions with the entity associated with the breach event.

2. The system of claim 1, wherein the CNN model comprises at least one convolutional layer configured to generate at least one feature map based on input image data, and wherein the CNN model comprises at least one pooling layer configured to summarize a presence of at least one feature in the feature map.

3. The system of claim 1, wherein the at least one processor is further configured to:

receive transaction data associated with the plurality of transactions completed in the first time period; and identify the set of suspected fraudulent transactions from the plurality of transactions based on inputting at least one parameter of the transaction data associated with the plurality of transactions into a fraud evaluation model.

4. The system of claim 3, wherein the at least one parameter comprises at least one of the following: chargeback data, reported fraud data, decline data, or any combination thereof.

5. The system of claim 1, wherein the at least one processor is further configured to:

generate display data configured to cause a computing device to display a user interface depicting the breach likelihood score of an image of the plurality of permuted images, the image, a time scale, and a visual indicator of where in the image the breach event occurred;

communicate the display data to a merchant system;

receive an instruction to execute a network security countermeasure from the merchant system; and execute the network security countermeasure.

6. The system of claim 1, wherein the at least one processor is further configured to:

in response to detecting the breach event, initiate a network security countermeasure comprising at least one of the following: declining transactions with the entity associated with the breach event, freezing at least one transaction account associated with at least one payment device associated with at least one transaction of the plurality of transactions, communicating at least one alert to a user of the at least one payment device, or any combination thereof.

7. The system of claim 1, wherein an intensity value of each point of the field of points of each image of the plurality of permuted images is based on a number of suspected fraudulent transactions associated with a payment device having occurred in a time subperiod.

8. A computer-implemented method comprising:

generating, with at least one processor, a plurality of permuted images, wherein each image of the plurality of permuted images comprises a field of points, wherein each point of the field of points is associated with at least one transaction of a set of suspected fraudulent transactions, wherein the field of points is distinguished in the image by at least one of hue, saturation, or brightness, wherein an x-axis position in the image of each point in the field of points is associated with a time subperiod of a first time period in which the at least one transaction occurred, and wherein a y-axis position in the image of each point in the field of points corresponds to a randomized index of a payment device of a plurality of payment devices associated with a plurality of transactions completed with an entity;

assigning, with the at least one processor, a breach likelihood score to each image of the plurality of permuted images using a convolutional neural network (CNN) model and based on patterns in the field of points of the image;

comparing, with the at least one processor, the breach likelihood score of each image of the plurality of permuted images to a threshold score generated from evaluations of transaction data from previous time periods and other breach events;

detecting, with the at least one processor, the breach event based on one or more breach likelihood scores of the plurality of permuted images satisfying the threshold score; and in response to detecting the breach event, declining, with the at least one processor, transactions with the entity associated with the breach event.

9. The computer-implemented method of claim 8, wherein the CNN model comprises at least one convolutional layer configured to generate at least one feature map based on input image data, and wherein the CNN model comprises at least one pooling layer configured to summarize a presence of at least one feature in the feature map.

10. The computer-implemented method of claim 8, further comprising:

receiving, with the at least one processor, transaction data associated with the plurality of transactions completed in the first time period; and identifying, with the at least one processor, the set of suspected fraudulent transactions from the plurality of transactions based on inputting at least one parameter of the transaction data associated with the plurality of transactions into a fraud evaluation model.

11. The computer-implemented method of claim 10, wherein the at least one parameter comprises at least one of the following: chargeback data, reported fraud data, decline data, or any combination thereof.

12. The computer-implemented method of claim 8, further comprising:

generating, with the at least one processor, display data configured to cause a computing device to display a user interface depicting the breach likelihood score of an image of the plurality of permuted images, the image, a time scale, and a visual indicator of where in the image the breach event occurred;

communicating, with the at least one processor, the display data to a merchant system;

receiving, with the at least one processor, an instruction to execute a network security countermeasure from the merchant system; and executing, with the at least one processor, the network security countermeasure.

13. The computer-implemented method of claim 8, further comprising:

in response to detecting the breach event, initiating, with the at least one processor, a network security countermeasure comprising at least one of the following: declining transactions with the entity associated with the breach event, freezing at least one transaction account associated with at least one payment device associated with at least one transaction of the plurality of transactions, communicating at least one alert to a user of the at least one payment device, or any combination thereof.

14. The computer-implemented method of claim 8, wherein an intensity value of each point of the field of points of each image of the plurality of permuted images is based on a number of suspected fraudulent transactions associated with a payment device having occurred in a time subperiod.

15. A computer program product comprising at least one non-transitory computer-readable medium including program instructions that, when executed by at least one processor, cause the at least one processor to:

generate a plurality of permuted images, wherein each image of the plurality of permuted images comprises a field of points, wherein each point of the field of points is associated with at least one transaction of a set of suspected fraudulent transactions, wherein the field of points is distinguished in the image by at least one of hue, saturation, or brightness, wherein an x-axis position in the image of each point in the field of points is associated with a time subperiod of a first time period in which the at least one transaction occurred, and wherein a y-axis position in the image of each point in the field of points corresponds to a randomized index of a payment device of a plurality of payment devices associated with a plurality of transactions completed with an entity;

assign a breach likelihood score to each image of the plurality of permuted images using a convolutional neural network (CNN) model and based on patterns in the field of points of the image;

compare the breach likelihood score of each image of the plurality of permuted images to a threshold score generated from evaluations of transaction data from previous time periods and other breach events;

detect the breach event based on one or more breach likelihood scores of the plurality of permuted images satisfying the threshold score; and in response to detecting the breach event, decline transactions with the entity associated with the breach event.

16. The computer program product of claim 15, wherein the CNN model comprises at least one convolutional layer configured to generate at least one feature map based on input image data, and wherein the CNN model comprises at least one pooling layer configured to summarize a presence of at least one feature in the feature map.

17. The computer program product of claim 15, wherein the program instructions further cause the at least one processor to:

receive transaction data associated with the plurality of transactions completed in the first time period; and identify the set of suspected fraudulent transactions from the plurality of transactions based on inputting at least one parameter of the transaction data associated with the plurality of transactions into a fraud evaluation model.

18. The computer program product of claim 17, wherein the at least one parameter comprises at least one of the following: chargeback data, reported fraud data, decline data, or any combination thereof.

19. The computer program product of claim 15, wherein the program instructions further cause the at least one processor to:

generate display data configured to cause a computing device to display a user interface depicting the breach likelihood score of an image of the plurality of permuted images, the image, a time scale, and a visual indicator of where in the image the breach event occurred;

communicate the display data to a merchant system;

receive an instruction to execute a network security countermeasure from the merchant system; and execute the network security countermeasure.

20. The computer program product of claim 15, wherein the program instructions further cause the at least one processor to:

in response to detecting the breach event, initiate a network security countermeasure comprising at least one of the following: declining transactions with the entity associated with the breach event, freezing at least one transaction account associated with at least one payment device associated with at least one transaction of the plurality of transactions, communicating at least one alert to a user of the at least one payment device, or any combination thereof.

* * * * *